United States Patent

Blum et al.

(10) Patent No.: US 6,986,480 B2
(45) Date of Patent: Jan. 17, 2006

(54) FORCE LIMITER PROVIDED ON A BELT RETRACTOR

(75) Inventors: Herbert Blum, Schwäbisch Gmünd (DE); Bernd Gentner, Ellwangen (DE); Thomas Kielwein, Eschach (DE)

(73) Assignee: TRW Occupant Restraint Systems GmbH & Co. KG, Aldorf (DE)

(*) Notice: Subject to any disclaimer, the term of this patent is extended or adjusted under 35 U.S.C. 154(b) by 0 days.

(21) Appl. No.: 10/665,331

(22) Filed: Sep. 19, 2003

(65) Prior Publication Data

US 2004/0056136 A1 Mar. 25, 2004

(30) Foreign Application Priority Data

Sep. 25, 2002 (DE) .................................. 202 14 811 U (51) Int. Cl.
*B60R 22/28* (2006.01)

(52) U.S. Cl. ............... 242/379.1; 297/472; 280/805
(58) Field of Classification Search ............. 242/379.1; 280/805, 806; 247/472
See application file for complete search history.

(56) References Cited

U.S. PATENT DOCUMENTS

| 5,613,647 | A | | 3/1997 | Dybro et al. |
| 6,131,843 | A | * | 10/2000 | Singer et al. ............. 242/379.1 |
| 6,416,008 | B1 | * | 7/2002 | Fujii et al. ............... 242/379.1 |
| 2004/0031872 | A1 | * | 2/2004 | Schmid ................... 242/379.1 |

FOREIGN PATENT DOCUMENTS

| DE | 19744836 | 5/1998 |
| DE | 19648472 | 7/1998 |

* cited by examiner

*Primary Examiner*—Kathy Matecki
*Assistant Examiner*—Sang Kim
(74) *Attorney, Agent, or Firm*—Tarolli, Sundheim, Covell & Tummino L.L.P.

(57) ABSTRACT

A force limiter is provided on a belt retractor. The belt retractor comprises a belt spool (1) that is rotatably mounted in a frame (10) and has at least one flange (1a) and a disk (2) that can be non-rotatably blocked on the frame. The disk (2) and the flange (1a) of the belt spool (1) are adapted to be coupled by a cutting element (3). The cutting element (3), with a relative rotation between the disk (2) and the flange (1a), comes into a coupling position and cuts material when the relative rotation is continued.

22 Claims, 6 Drawing Sheets

FORCE LIMITER PROVIDED ON A BELT RETRACTOR

TECHNICAL FIELD

The invention relates to a force limiter provided on a belt retractor.

BACKGROUND OF THE INVENTION

A belt retractor commonly comprises a belt spool that is rotatably mounted in a frame and has at least one flange and a disk that can be non-rotatably blocked on the frame. Force limiters on belt retractors are usually based on the principle of plastic material deformation. If the belt force exceeds a predefined value, then a belt spool rotation in the unwinding direction is permitted against a defined resistance. In prior-art designs of belt retractors, the hollow belt spool is rigidly connected at one axial end thereof to a torsion bar that is arranged coaxially in the cavity of the belt spool, the torsion bar being non-rotatably coupled at the opposite end to a disk that is non-rotatably blocked by a blocking mechanism on the frame of the belt retractor in case of locking. The force level at which the limiting proceeds is determined by the torsional stiffness of the torsion bar. With such a force limiter, the course of the force level cannot be varied to any great extent across the angle of rotation of the belt spool.

In case of belt retractors which are used in the rear seat area where no airbags are provided, there additionally is the problem that the belt spool rotation during force limiting has to be restricted, so that the vehicle occupant to be restrained does not come into contact with the back rest of the front seat. Force limiters available up to now only allow an unwinding of belt webbing which at maximum corresponds to one revolution of the belt spool.

The invention provides a force limiter for belt retractors with which the course of the force level can be varied in a wide range across the angle of rotation of the belt spool, so that especially a degressive and/or a progressive characteristic curve is also possible. Further, in other embodiments of the invention there is realized an unwinding of the belt webbing in the order of several revolutions of the retractor, and there is used a force limiting stop as a function of the angle of rotation of the belt spool.

BRIEF SUMMARY OF THE INVENTION

The force limiter proposed is based on the principle of energy conversion by means of material cutting. According to the invention, the belt retractor for which the force limiter is intended comprises a belt spool that is rotatably mounted in a frame and has at least one flange and a disk that can be non-rotatably blocked on the frame. The disk and the flange of the belt spool are adapted to be coupled by a cutting element. The cutting element, with a relative rotation between the disk and the flange, comes into a coupling position and cuts material when the relative rotation is continued. The resistance to be overcome here depends on the cutting width and on the cutting depth. By specifically varying the parameters "cutting width" and "cutting depth", the course of the force level across the angle of rotation of the belt spool can be adjusted virtually at will. In particular, it is easily possible to achieve a degressive course of the force level by means of a cutting width and/or cutting depth that decreases across the relative angle of rotation.

In the preferred embodiment, the cutting element is arranged on the disk and the material cutting takes place on the opposite end face of the belt spool flange.

In a further embodiment of the invention there is realized an extended unwinding of belt webbing in that the disk and the flange, with the disk being blocked, come into a condition of coupling by the cutting element not until the relative rotation between disk and flange will be continued.

In a further embodiment a coaxially arranged force limiting stop completely blocks the belt spool after a defined unwinding of belt webbing which can correspond to several revolutions of the retractor.

DETAILED DESCRIPTION OF THE PREFERRED EMBODIMENTS

Figure 1:
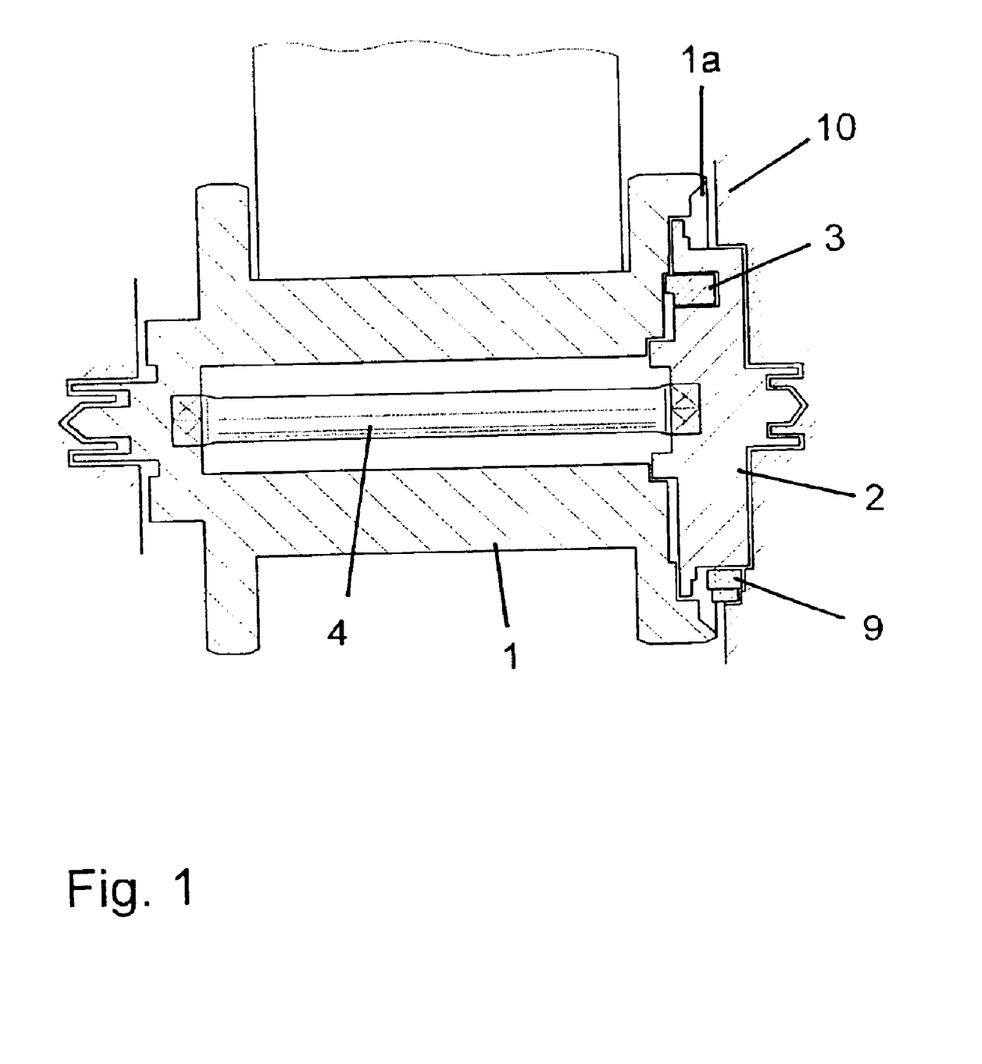
FIG. 1 is a schematic sectional view of a belt retractor including a force limiter.

The belt retractor shown schematically in FIG. 1 has a frame 10 and a belt spool 1 that is rotatably mounted in the frame. On a flange 1a of the belt spool 1, there is a disk 2 that can be non-rotatably blocked on the frame 10 by means of a blocking mechanism 9. The disk 2 is non-rotatably connected to the flange 1a of the belt spool 1 by means of shear pins 11. In the hollow interior of the belt spool 1, there is a torsion bar 4 that is non-rotatably coupled to the disk 2 at one axial end and that is non-rotatably coupled to the belt spool 1 at the opposite end.

Figure 2:
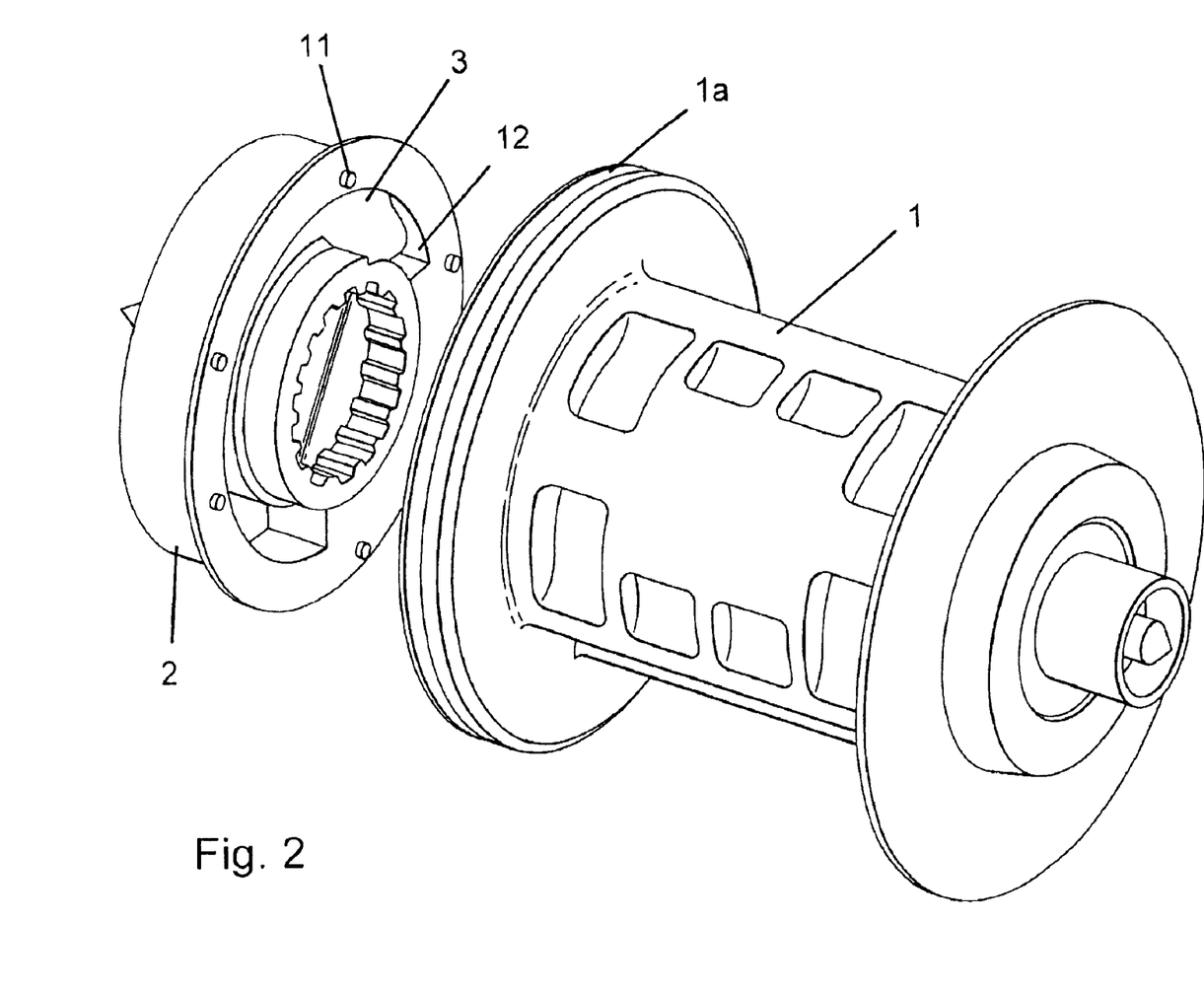
FIG. 2 is an exploded perspective view of the belt spool and of the disk of the belt retractor that can be non-rotatably blocked, with a view onto a cutting element accommodated in a recess of the disk.

On its side facing the flange 1a, the disk 2 has a recess 12 into which a cutting element 3 is inserted. The cutting element 3 is supported in the recess 12 axially and also in the circumferential direction. The cutting element 3 has a blade that projects axially beyond the end face of the disk 2 facing the flange 1a when disk 2 and flange 1a are coupled to each other.

Figure 3:
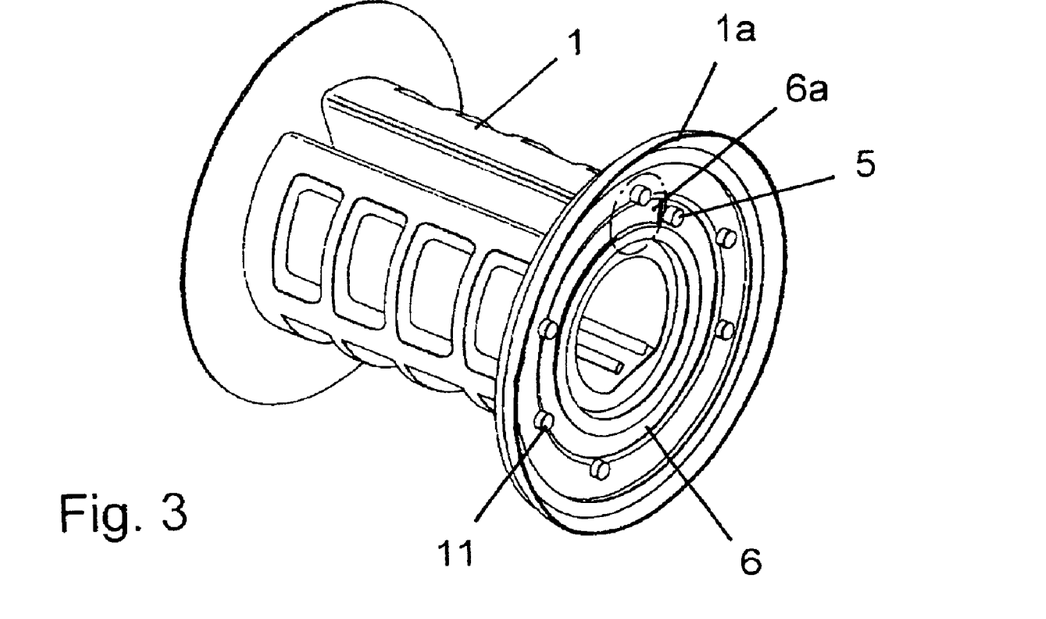
FIG. 3 is a perspective view of a first embodiment of the belt spool for the force limiter.

In the embodiment shown in FIG. 3, a coaxial ring groove 6 is shaped onto the end face of the flange 1a facing the disk 2. The ring groove 6 has a starting section 6a into which the blade of the cutting element 3 projects. The penetration depth of the blade into the ring groove 6 in this starting section 6a is, for example, about 0.8 mm. The groove 6 in this embodiment has a radial width that remains constant along the circumference. Correspondingly, the cutting element has a cutting width that remains constant along the extension of the ring groove 6, for example, 330°. The ring groove 6, however, has a negative axial inclination so that the cutting depth decreases along the extension of the ring groove 6 as the relative angle of rotation between the belt spool 1 and the disk 2 increases. At a relative angle of rotation of 330°, the blade of the cutting element 3 will come out of engagement with the material of the flange 1a.

In case of locking that is triggered in a vehicle-sensitive or belt-sensitive manner, the disk 2 is non-rotatably blocked by the blocking mechanism 9 on the frame 10 of the belt retractor. As a result, the belt spool 1 is also non-rotatably blocked via the torsion bar 4 on the frame 10, but only up to a belt load at which torsion of the torsion bar does not yet occur. As soon as this belt load is exceeded, a relative rotation of the belt spool 1 to the disk 2 occurs with simultaneous twisting of the torsion bar. During this relative rotation, however, the blade of the cutting element 3 also engages with the material of the flange 1a of the belt spool 1. A further relative rotation is only possible if the blade of the cutting element 3 cuts a chip out of the bottom of the ring groove 6. This chip is initially relatively thick, and decreases as the relative angle of rotation increases. Thus, energy is converted by material cutting and this takes place parallel to the energy conversion due to the twisting of the torsion bar. With such a force limiter, as is illustrated in FIG. 7 and FIGS. 8a to 8d, a degressive, progressive and/or sectionwise constant course of the force level across the relative angle of rotation can be achieved; this depends on whether the radial cutting width or the axial cutting depth of the blade decreases, increases or remains constant with an increasing relative angle of rotation. By such principle, there will be possible any arbitrary course of the force level as a function of the relative angle of rotation.

Figure 4:
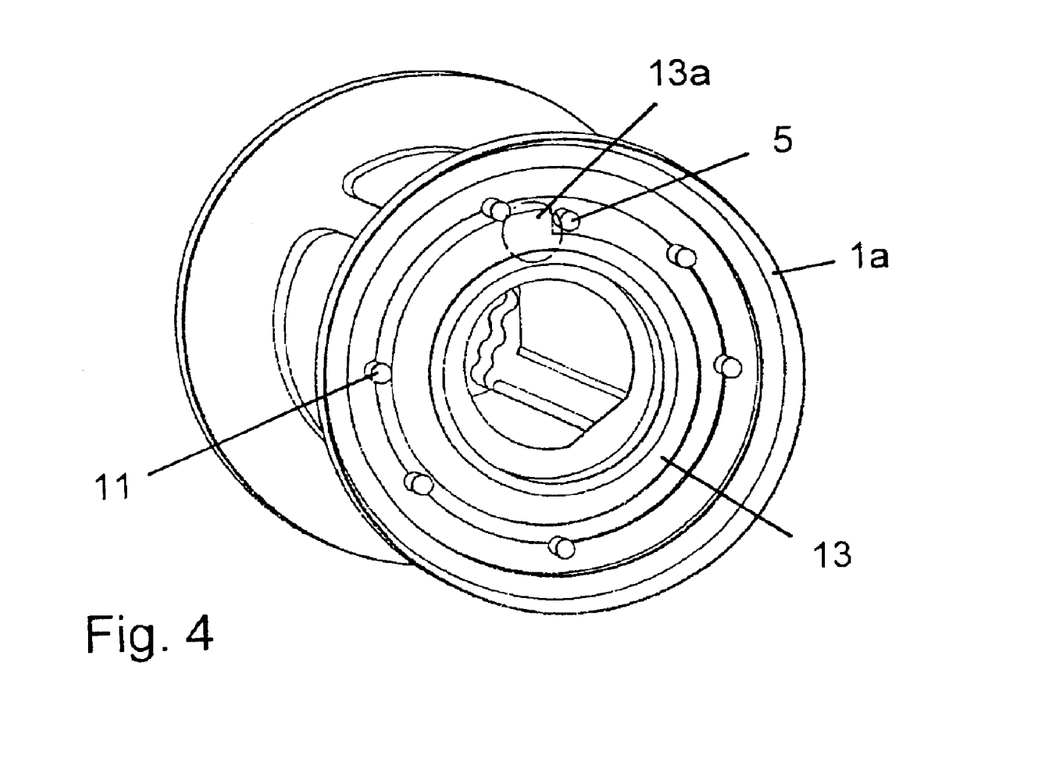
FIG. 4 is a perspective view of a second embodiment of a belt spool for the force limiter.

A similar degressive and/or progressive or also constant curve of the force level can also be achieved with the embodiment shown in FIG. 4. In this embodiment, the cutting width decreases as the relative angle of rotation between the belt spool and the disk increases. This is achieved with a ring groove 13 which likewise has a starting section 13a and whose outer radius increases as the relative angle of rotation increases.

Figure 5:
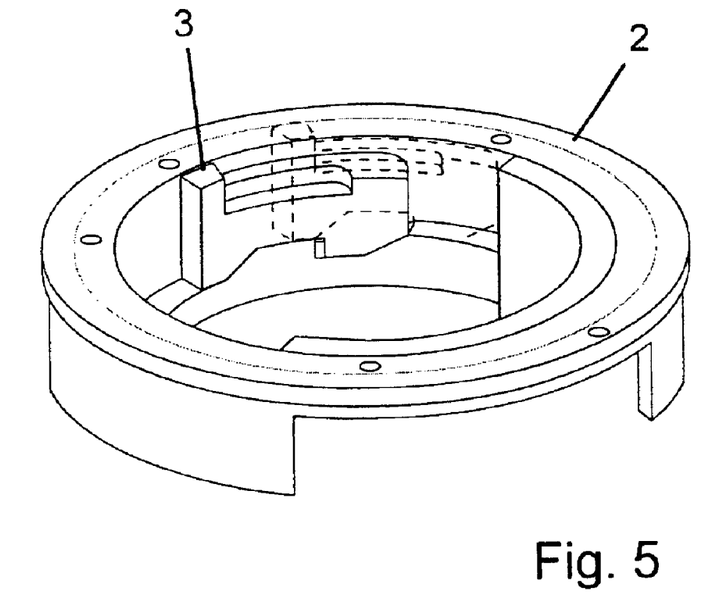
FIG. 5 is a schematic perspective view of a disk of a belt retractor according to the invention, with a view onto a cutting element adapted to be moved on an inclined plane.

The coupling position of the blade is achieved in one embodiment of the invention by an axial shifting of the cutting element 3. In the normal condition of the belt retractor, in which the disk 2 is not blocked through the blocking mechanism 9, the blade of the cutting element 3 in this embodiment does not project axially beyond the end face facing the flange 1a. It is only by a continued relative rotation between disk 2 and flange 1a, with the disk 2 being blocked, that the cutting body 3—which after e.g. about 360° comes up against a control pin 5 provided on the flange 1a—is moved via an inclined plane into a position in which the blade projects axially beyond the end face of the disk 2 facing the flange 1a. FIG. 5 shows a disk 2 in such condition including an inclined plane on which the cutting element 3 is moved.

Figure 6:
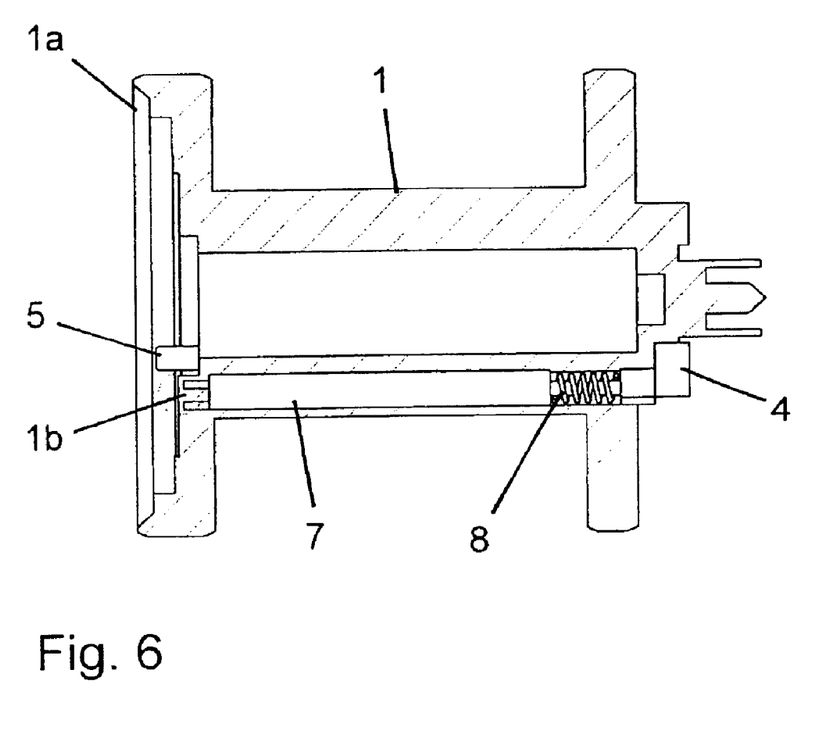
FIG. 6 is a schematic sectional view of a belt retractor including a force limiting stop.

FIG. 6 schematically shows an embodiment, according to the invention, of a belt spool 1 with a control pin 5 on the flange 1a and a force limiting stop 7 which is mounted coaxially to the belt spool by means of a pressure spring 8 and a cover cap 14. On the end of the belt spool 1 lying opposite disk 2, the stop 7 is mounted by means of a pressure spring 8 and a cover cap 14 and is supported by the flange 1a in the region of the ring groove 6, 13. In case the material of the flange 1a is removed by the blade of the cutting element 3 on the bottom of the ring groove 6, 13 in the zone 1b, the stop 7 will be freed and moved by the pressure spring 8 in axial direction into a position of engagement with the cutting element 3. In the process, the stop 7 projects axially beyond the end face of flange 1a. With the relative rotation between disk 2 and belt spool 1 being continued, the blade comes up against stop 7 after a further relative rotation of about 360°, whereby the rotational motion will be stopped. The stop 7 has a strength which is so high that it will not be cut by the cutting element 3. Thus, a further rotation of the belt spool in the unwinding direction will be prevented.

The cutting element 3 generally can be embodied as an insert piece or formed on the disk 2. The principle, according to the invention, of energy conversion by metal cutting may also be realized by an embodiment of the belt retractor in which a cutting element is arranged on the axis of the belt spool and cuts material on the disk of the force limiter.

Figure 7:
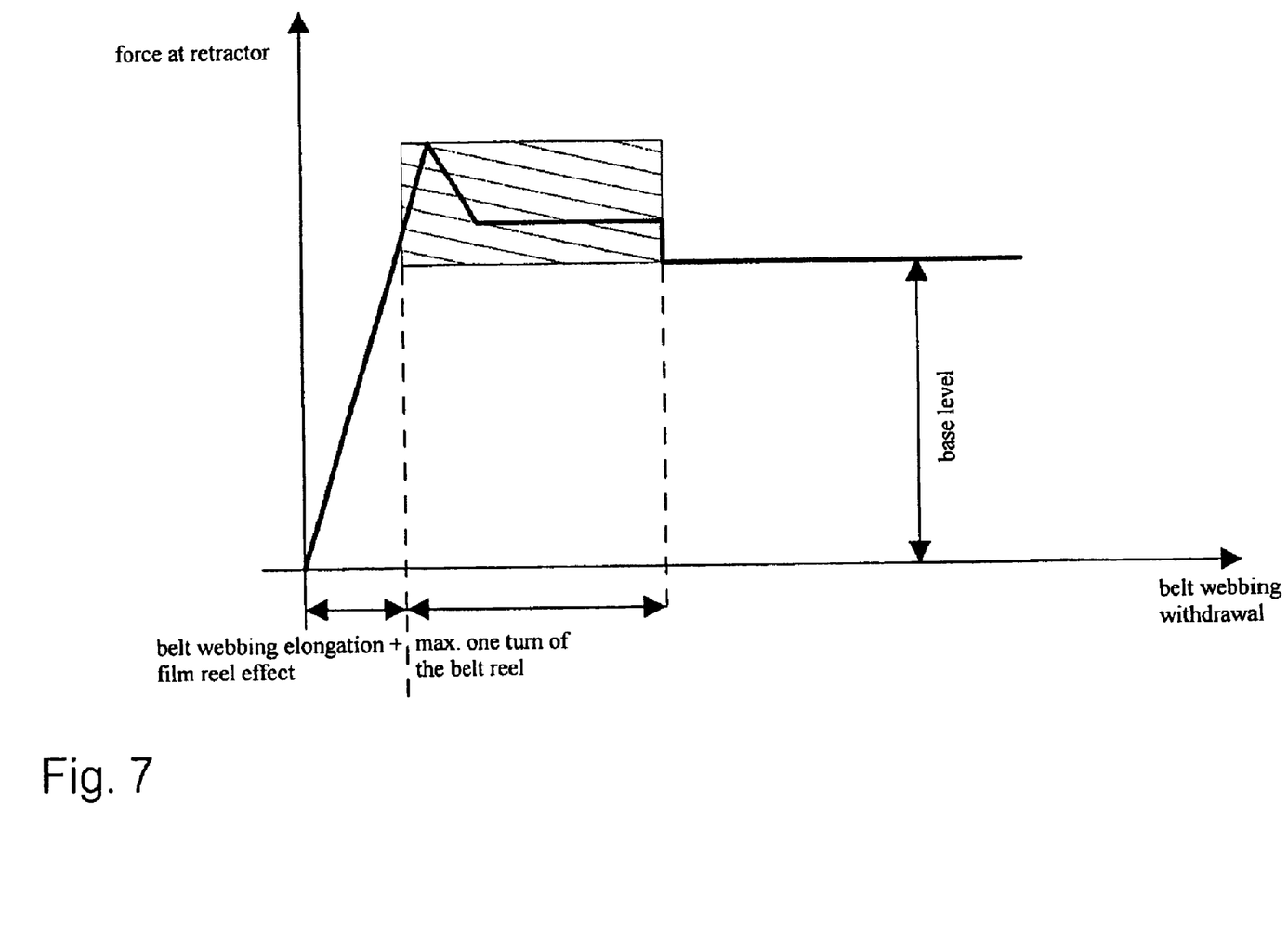
FIG. 7 is a diagram showing the complete course of the force level as a function of the relative angle of rotation of the force limiter.

The principle of energy conversion by metal cutting can be realized in many ways with a belt retractor of the type described. FIG. 7 shows for one embodiment the complete course of the force level as a function of the relative angle of rotation of the force limiter with an area illustrated hatched, in which any desired course can be achieved by an appropriate depth or width of cut and the cutting process can be influenced by controlling the axial position of the cutting element. The base level of the force underneath the hatched area is predetermined by the torsion bar. FIGS. 8a to 8d show different progressive, degressive and constant course sections of the controllable zone according to FIG. 7.

Figure 8:
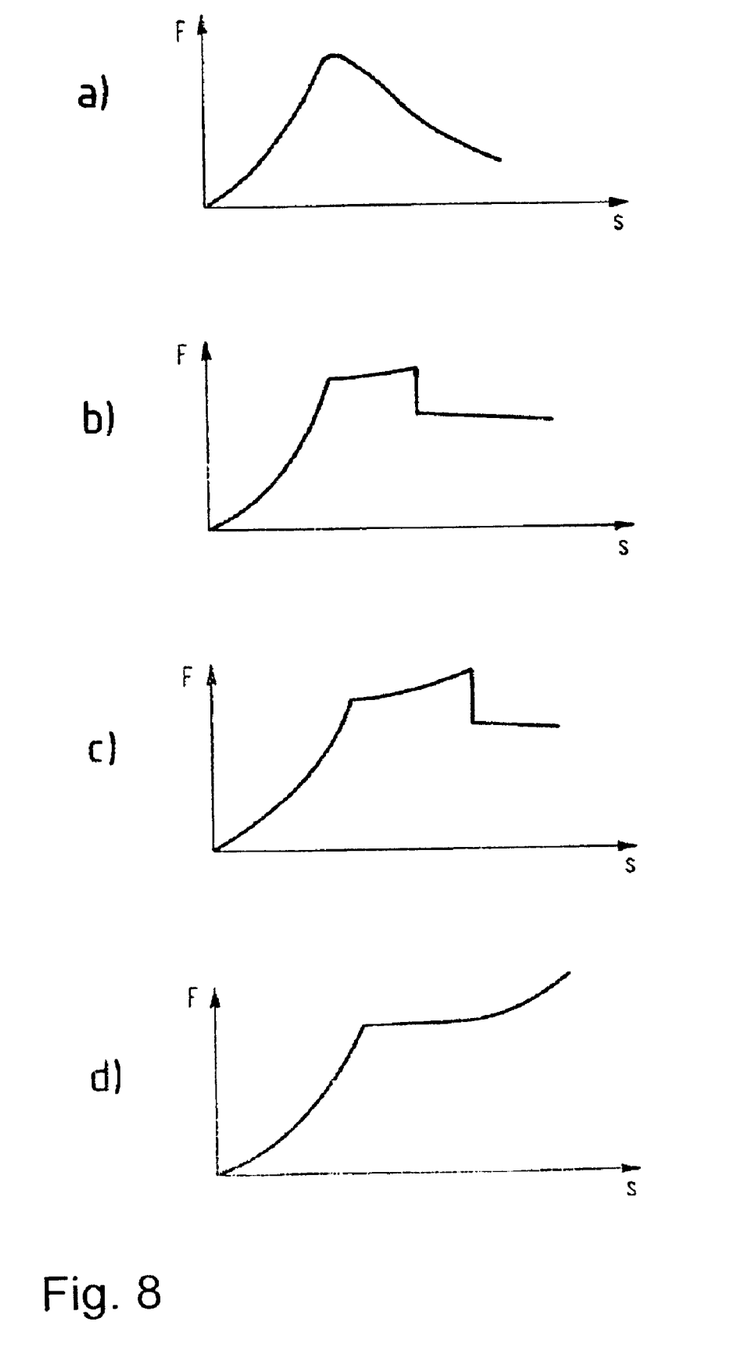
FIGS. 8a to 8d are diagrams showing possible partial courses of the force level as a function of the relative angle of rotation for various embodiments of the force limiter.

In an embodiment according to FIG. 8a, there is first achieved a progressive curve by means of an increasing cutting width and/or cutting depth, which is followed by a degressive course by means of a decreasing cutting width and/or cutting depth.

In the embodiment according to FIG. 8b, it is assumed that the cutting process is triggered by means of a pyrotechnical actuator that acts on the cutting element. The cutting process can be deactivated by means of a lubricant which is selectively used.

In FIG. 8c, the cutting process first begins with an increasing cutting width and/or cutting depth so that a progressive curve is created, after which a switching procedure brings about a reduction to a lower force level.

In the embodiment shown in FIG. 8d, several blades are used in parallel which can be activated consecutively in order to likewise achieve a progressive course of the force level.

What is claimed is:

1. A force limiter provided on a belt retractor, said belt retractor comprising a belt spool (1) that is rotatably mounted in a frame (10) and has at least one flange (1a) and a disk (2) that can be non-rotatably blocked on said frame, characterized in that said disk (2) and said flange (1a) of said belt spool (1) are adapted to be coupled by a cutting element (3) which, with a relative rotation between said disk (2) and said flange (1a), comes into a coupling position and cuts material when said relative rotation is continued, wherein said cutting element (3) is accommodated in a recess (12) of said disk (2) and supported for movement in an axial direction as well as in a circumferential direction, and in that said cutting element has a blade that in said coupling position engages on an end face of said flange (1a) opposite to said blade, and wherein said flange (1a) has a control pin (5) that transfers said cutting element (3) by means of an inclined plane axially into said coupling position, when said relative rotation between said disk (2) and said flange (1a) occurs.

2. The force limiter according to claim 1, characterized in that said control pin (5) is sheared off when said relative rotation continues.

3. A force limiter provided on a belt retractor, said belt retractor comprising a belt spool (1) that is rotatably mounted in a frame (10) and has at least one flange (1a) and a disk (2) that can be non-rotatably blocked on said frame, characterized in that said disk (2) and said flange (1a) of said belt spool (1) are adapted to be coupled by a cutting element (3) which, with a relative rotation between said disk (2) and said flange (1a), comes into a coupling position and cuts material when said relative rotation is continued, wherein a coaxial ring groove (6, 13) is provide on an end face of said flange (1a).

4. The force limiter according to claim 3, characterized in that said ring groove (6, 13) has a starting section (6a, 13a) into which said blade of said cutting element (3) projects in said coupling position.

5. The force limiter according to claim 3, characterized in that a radial cutting width of said blade of said cutting element (3) decreases as a relative angle of rotation increases.

6. The force limiter according to claim 3, characterized in that a radial cutting width of said blade of said cutting element (3) increases as a relative angle of rotation increases.

7. The force limiter according to claim 3, characterized in that a radial cutting width of said blade of said cutting element (3) remains constant as a relative angle of rotation increases.

8. The force limiter according to claim 3, characterized in that an axial cutting depth of said blade of said cutting element (3) decreases as a relative angle of rotation increases.

9. The force limiter according to claim 3, characterized in that an axial cutting depth of said blade of said cutting element (3) increases as a relative angle of rotation increases.

10. The force limiter according to claim 6, characterized in that an axial cutting depth of said blade of said cutting element (3) remains constant as a relative angle of rotation increases.

11. The force limiter according to claim 3, characterized in that said belt spool has a stop (7) which, after a cutting procedure on said material that can be caught by said cutting element (3) during said relative rotation, is moved via a pressure spring (8) in an axial direction into a position of engagement with said cutting element (3).

12. The force limiter according to claim 11, characterized in that said stop (7) has a strength that is sufficiently high to prevent it from being cut by said cutting element (3) during engagement with the latter.

13. A belt retractor comprising a force limiter, said belt retractor also comprising a belt spool (1) that is rotatably mounted in a frame (10), said belt spool having at least one flange (1a), and a disk (2) that can be non-rotatably blocked on said frame, said disk (2) and said flange (1a) of said belt spool (1) being adapted to be coupled by a cutting element (3) which, upon a relative rotation between said disk (2) and said flange (1a), comes into a coupling position and cuts material when said relative rotation is continued, wherein said cutting element (3) is accommodated in a recess (12) of said disk (2) and supported for movement in an relative to said disk (2), and in that said cutting element has a blade that in said coupling position engages on an end face of said flange (1a) opposite to said blade, and wherein said flange (1a) has a control pin (5) that transfers said cutting element (3) by means of said control pin (5) and an inclined plane axially into said coupling position, when said relative rotation between said disk (2) and said flange (1a) occurs.

14. A force limiter for a belt retractor, the belt retractor comprising a belt spool that has at least one flange and that is mounted in a frame for rotation about an axis and a disk that can be non-rotatably blocked on the frame, said force limiter comprising a cutting element that can couple the flange and the disk so as to cut material upon relative rotation between the flange and the disk, the cutting element traveling in a ring groove when cutting material.

15. A force limiter according to claim 14 wherein the cutting element cuts material from the ring groove.

16. A force limiter according to claim 14 wherein the cutting element is mounted on one of the flange and the disk and the ring groove is provided on the other of the flange and the disk.

17. A force limiter according to claim 14 wherein the ring groove is provided on an end face of the flange.

18. A force limiter for a belt retractor, the belt retractor comprising a belt spool that has at least one flange and that is mounted in a frame for rotation about an axis, said force limiter comprising a cutting element that can couple the flange and the frame so as to cut material upon relative rotation between the flange and the frame, the cutting element traveling in a ring groove when cutting material.

19. A force limiter according to claim 18 wherein the cutting element cuts material from the ring groove.

20. A force limiter according to claim 18 further comprising a disk that can be non-rotatably blocked on the frame.

21. A force limiter according to claim 20 wherein the cutting element is mounted on one of the flange and the disk and the ring groove is provided an the other of the flange and the disk.

22. A force limiter according to claim 21 wherein the ring groove is provided on an end face of the flange.

* * * * *

UNITED STATES PATENT AND TRADEMARK OFFICE
CERTIFICATE OF CORRECTION

PATENT NO.         : 6,986,480 B2
APPLICATION NO. : 10/665331
DATED              : January 17, 2006
INVENTOR(S)        : Herbert Blum et al.

It is certified that error appears in the above-identified patent and that said Letters Patent is hereby corrected as shown below:

Column 6, line 8 after "an" insert --axial direction as well as in a circumferential direction--.

Signed and Sealed this

Eighth Day of August, 2006

JON W. DUDAS
*Director of the United States Patent and Trademark Office*